United States Patent
Campbell et al.

(10) Patent No.: US 7,499,864 B2
(45) Date of Patent: Mar. 3, 2009

(54) INTEGRATED TRAVEL INDUSTRY SYSTEM

(75) Inventors: David E. Campbell, Miami, FL (US); Matt Fitzgerald, Omaha, NE (US); Philip A. Garcia, Phoenix, AZ (US); James Klein, Glendale, AZ (US); Michael Keith Laughlin, Phoenix, AZ (US); Mike Qualantone, Phoenix, AZ (US); Debbie L. Schultz, Scottsdale, AZ (US); Jean Shapiro, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 10/217,666

(22) Filed: Aug. 12, 2002

(65) Prior Publication Data

US 2003/0144867 A1    Jul. 31, 2003

Related U.S. Application Data

(60) Provisional application No. 60/351,804, filed on Jan. 25, 2002.

(51) Int. Cl.
G06Q 10/00 (2006.01)
(52) U.S. Cl. .............................. 705/1; 705/5
(58) Field of Classification Search ............... 705/5, 705/6, 1
See application file for complete search history.

(56) References Cited

U.S. PATENT DOCUMENTS

| | | | |
|---|---|---|---|
| 4,359,631 A | 11/1982 | Lockwood et al. | |
| 4,449,186 A | 5/1984 | Kelly et al. | |
| 4,490,810 A | 12/1984 | Hon | |
| 4,818,854 A | 4/1989 | Davies et al. | |
| 4,845,625 A | 7/1989 | Stannard | |
| 4,862,357 A | 8/1989 | Ahlstrom et al. | |
| 4,922,439 A | 5/1990 | Greenblatt | |
| 4,965,763 A | 10/1990 | Zamora | |

(Continued)

FOREIGN PATENT DOCUMENTS

EP    0762306    3/1997

(Continued)

OTHER PUBLICATIONS no author; Web Ventures Announces Version 4 of BookIt PRO'—Gives Full Travel Agent Access to Airline Computer Reservations Systesm over the Internet; Oct. 1998; PR Newswire; dialog copy, 2 pages.*

(Continued)

Primary Examiner—John W. Hayes
Assistant Examiner—Nathan Erb
(74) Attorney, Agent, or Firm—Snell & Wilmer L.L.P.

(57) ABSTRACT

A system and method providing a centralized network for facilitating travel reservations and/or services. The system comprises a network with hub sites that provide a centralized connection for Global Distribution Systems/Computer Reservation Systems, travel vendors, and travel office point of service terminals. The travel office point of service terminals provide a plurality of modules for various travel related applications such as a low fare search module, a computer telephony integration module, a super passenger name record database, a customer database, a trip planning module, a customer relationship management module, a workflow module, and an integrated e-mail booking system.

12 Claims, 4 Drawing Sheets

U.S. PATENT DOCUMENTS

| | | | |
|---|---|---|---|
| 5,021,953 A | 6/1991 | Webber et al. | |
| 5,056,019 A | 10/1991 | Schultz et al. | |
| 5,155,678 A * | 10/1992 | Fukumoto et al. | 707/202 |
| 5,191,523 A | 3/1993 | Whitesage | |
| 5,235,509 A | 8/1993 | Mueller et al. | |
| 5,235,680 A | 8/1993 | Bijnagte | |
| 5,237,499 A | 8/1993 | Garback | |
| 5,239,480 A | 8/1993 | Huegel | |
| 5,241,671 A | 8/1993 | Reed et al. | |
| 5,253,165 A | 10/1993 | Leiseca et al. | |
| 5,253,166 A * | 10/1993 | Dettelbach et al. | 705/5 |
| 5,255,184 A | 10/1993 | Hornick et al. | |
| 5,270,921 A | 12/1993 | Hornick | |
| 5,274,758 A | 12/1993 | Beitel et al. | |
| 5,287,278 A | 2/1994 | Rau | |
| 5,289,371 A | 2/1994 | Abel et al. | |
| 5,331,546 A | 7/1994 | Webber et al. | |
| 5,393,964 A | 2/1995 | Hamilton et al. | |
| 5,408,417 A | 4/1995 | Wilder | |
| 5,422,809 A | 6/1995 | Griffin et al. | |
| 5,459,306 A | 10/1995 | Stein et al. | |
| 5,483,444 A | 1/1996 | Heintzeman et al. | |
| 5,526,443 A | 6/1996 | Nakayama | |
| 5,570,283 A | 10/1996 | Shoolery et al. | |
| 5,581,461 A | 12/1996 | Coll et al. | |
| 5,598,557 A | 1/1997 | Doner et al. | |
| 5,644,721 A | 7/1997 | Chung et al. | |
| 5,648,900 A | 7/1997 | Bowen et al. | |
| 5,652,842 A | 7/1997 | Siegrist, Jr. et al. | |
| 5,687,322 A | 11/1997 | Deaton et al. | |
| 5,761,442 A | 6/1998 | Barr et al. | |
| 5,764,981 A | 6/1998 | Brice et al. | |
| 5,781,892 A | 7/1998 | Hunt et al. | |
| 5,809,478 A | 9/1998 | Grfeco et al. | |
| 5,812,134 A | 9/1998 | Pooser et al. | |
| 5,832,451 A | 11/1998 | Flake et al. | |
| 5,832,453 A | 11/1998 | O'Brien | |
| 5,832,454 A | 11/1998 | Jafri et al. | |
| 5,839,114 A * | 11/1998 | Lynch et al. | 705/5 |
| 5,842,176 A | 11/1998 | Hunt et al. | |
| 5,857,175 A | 1/1999 | Day et al. | |
| 5,884,272 A | 3/1999 | Walker et al. | |
| 5,894,311 A | 4/1999 | Jackson | |
| 5,894,475 A * | 4/1999 | Bruno et al. | 370/389 |
| 5,897,620 A | 4/1999 | Walker et al. | |
| 5,909,510 A | 6/1999 | Nakayama | |
| 5,918,022 A * | 6/1999 | Batz et al. | 709/236 |
| 5,926,798 A | 7/1999 | Carter | |
| 5,940,803 A | 8/1999 | Kanemitsu | |
| 5,948,040 A | 9/1999 | DeLorme et al. | |
| 5,953,706 A | 9/1999 | Patel | |
| 5,960,383 A | 9/1999 | Fleischer | |
| 5,968,125 A | 10/1999 | Garrick et al. | |
| 5,974,396 A | 10/1999 | Anderson et al. | |
| 5,983,246 A | 11/1999 | Takano | |
| 5,987,252 A | 11/1999 | Leino et al. | |
| 5,995,939 A | 11/1999 | Berman et al. | |
| 5,999,728 A | 12/1999 | Cable | |
| 6,009,403 A | 12/1999 | Sato | |
| 6,009,408 A | 12/1999 | Buchanan | |
| 6,012,069 A | 1/2000 | Shibazaki | |
| 6,018,715 A | 1/2000 | Lynch et al. | |
| 6,018,718 A | 1/2000 | Walker et al. | |
| 6,023,679 A * | 2/2000 | Acebo et al. | 705/5 |
| 6,024,288 A | 2/2000 | Gottlich et al. | |
| 6,028,601 A | 2/2000 | Machiraju et al. | |
| 6,029,144 A | 2/2000 | Barrett et al. | |
| 6,067,532 A | 5/2000 | Gebb | |
| 6,070,147 A | 5/2000 | Harms et al. | |
| 6,085,164 A | 7/2000 | Smith et al. | |
| 6,085,169 A | 7/2000 | Walker et al. | |
| 6,085,976 A | 7/2000 | Sehr | |
| 6,101,477 A | 8/2000 | Hohle et al. | |
| 6,112,185 A | 8/2000 | Walker et al. | |
| 6,118,989 A | 9/2000 | Abe et al. | |
| 6,119,094 A | 9/2000 | Lynch et al. | |
| 6,119,095 A | 9/2000 | Morita | |
| 6,119,096 A | 9/2000 | Mann et al. | |
| 6,119,229 A | 9/2000 | Martinez et al. | |
| 6,121,969 A | 9/2000 | Jain et al. | |
| 6,122,642 A | 9/2000 | Mehovic | |
| 6,134,534 A | 10/2000 | Walker et al. | |
| 6,148,290 A | 11/2000 | Dan et al. | |
| 6,151,582 A | 11/2000 | Huang et al. | |
| 6,157,915 A | 12/2000 | Bhaskaran et al. | |
| 6,157,918 A | 12/2000 | Shepherd | |
| 6,163,771 A | 12/2000 | Walker et al. | |
| 6,167,368 A | 12/2000 | Wacholder | |
| 6,185,524 B1 | 2/2001 | Carus et al. | |
| 6,185,558 B1 | 2/2001 | Bowman et al. | |
| 6,185,592 B1 | 2/2001 | Boguraev et al. | |
| 6,188,989 B1 | 2/2001 | Kennedy | |
| 6,195,644 B1 | 2/2001 | Bowie | |
| 6,199,147 B1 | 3/2001 | Smith et al. | |
| 6,223,163 B1 | 4/2001 | Van Luchene | |
| 6,229,534 B1 * | 5/2001 | Gerra et al. | 715/733 |
| 6,263,315 B1 | 7/2001 | Talluri | |
| 6,292,790 B1 | 9/2001 | Krahn et al. | |
| 6,304,850 B1 | 10/2001 | Keller et al. | |
| 6,324,517 B1 | 11/2001 | Bingham et al. | |
| 6,336,097 B1 | 1/2002 | Scipioni | |
| 6,442,526 B1 | 8/2002 | Vance et al. | |
| 6,477,520 B1 | 11/2002 | Malaviya et al. | |
| 6,754,634 B1 | 6/2004 | Ho | |
| 6,804,658 B2 | 10/2004 | Lim et al. | |
| 6,839,679 B1 | 1/2005 | Lynch et al. | |
| 6,944,133 B2 * | 9/2005 | Wisner et al. | 370/242 |
| 6,963,854 B1 | 11/2005 | Boyd et al. | |
| 7,016,859 B2 | 3/2006 | Whitesage | |
| 7,050,986 B1 | 5/2006 | Vance et al. | |
| 7,165,036 B2 | 1/2007 | Kruk et al. | |
| 7,302,399 B1 | 11/2007 | Donovan et al. | |
| 2001/0005831 A1 | 6/2001 | Lewin et al. | |
| 2001/0034626 A1 | 10/2001 | Gillespie | |
| 2001/0047289 A1 * | 11/2001 | Mckee et al. | 705/9 |
| 2001/0049693 A1 | 12/2001 | Pratt | |
| 2001/0051885 A1 | 12/2001 | Nardulli et al. | |
| 2001/0054105 A1 | 12/2001 | Furusawa et al. | |
| 2002/0010604 A1 | 1/2002 | Block | |
| 2002/0013774 A1 | 1/2002 | Morimoto | |
| 2002/0077871 A1 | 6/2002 | Udelhoven et al. | |
| 2002/0143587 A1 | 10/2002 | Champernowne | |
| 2002/0152100 A1 * | 10/2002 | Chen et al. | 705/5 |
| 2002/0152101 A1 | 10/2002 | Lawson et al. | |
| 2002/0178034 A1 | 11/2002 | Garner et al. | |
| 2003/0040946 A1 | 2/2003 | Sprenger et al. | |
| 2003/0055690 A1 | 3/2003 | Garback | |
| 2003/0110063 A1 | 6/2003 | Among et al. | |
| 2003/0115159 A1 | 6/2003 | Gillespie | |
| 2003/0120526 A1 | 6/2003 | Altman et al. | |
| 2003/0140007 A1 | 7/2003 | Kramer et al. | |
| 2003/0144867 A1 | 7/2003 | Campbell et al. | |
| 2004/0260581 A1 | 12/2004 | Baranowski et al. | |
| 2004/0267623 A1 | 12/2004 | Vivadelli et al. | |
| 2005/0015295 A1 | 1/2005 | McCulloch | |
| 2006/0111956 A1 | 5/2006 | Whitesage | |
| 2006/0146806 A1 | 7/2006 | Khuc et al. | |
| 2006/0212321 A1 | 9/2006 | Vance et al. | |
| 2007/0055555 A1 * | 3/2007 | Baggett et al. | 705/5 |

FOREIGN PATENT DOCUMENTS

| | | |
|---|---|---|
| FR | 2586316 A1 | 2/1987 |
| JP | 2002-32682 A | 1/2002 |

| | | |
|---|---|---|
| WO | WO 95/26007 | 9/1995 |
| WO | WO 97/17680 * | 5/1997 |
| WO | WO 01/04823 A2 | 1/2001 |
| WO | WO 01/61607 | 8/2001 |
| WO | WO 02/29672 | 4/2002 |

OTHER PUBLICATIONS

Orbitz web site; Sep. 30, 2001, Wayback Machine web archive site, 1 page.*

Travelocity web site; Nov. 21, 2001, Wayback Machine web archive site 2 pages.* thefreedictionary.com website; Dec. 12, 2005; 1 page.*

ITT Business Travel News, Jul. 15, 1996, ISSN#8750-3670, p. 36.

"An Evaluation of Statistical Approaches to Text Categorization", Yiming Yang, Apr. 10, 1997, CMU-CS-97-127.

Maritz Deal, www.findarticles.com, Feb. 14, 2000.

"The Table Lens: Merging Graphical and Symbolic Representations in an Interactive Focus + Context Visualization for Tabular Information", by R. Rao and S. Card, Human Factors in Computing Systems, CHI '94, "Celebrating Independence", pp. 318-322, 481-482.

DiFlorio, Diono, et al., Air Deal Manager: Corporate Travel Expense Optimisation with the SAS System SAS Converence XIX SEUGI, May-Jun. 2001.

Campbell, Jay, Dacoda opens for biz: Rosenbluth launches contract optimization service for non-clients, Business Travel News, vol. 18, No. 24, Nov. 12, 2001.

Simbologica Web Pages, Simbologica, Oct. 2006.

Fichter and Cervone; Documents, Data Information Retrieval, & XML; document retrieval: difficulties of retrieving information from document repositories Online Nov. 1, 2000.

"Chapter 3—Memory Management", copyright 1996-1999.

"Memory Offset Annotation".

Clemons, Eric K., et al., Ahead of the Pack Through Vision and Hustle: A Case Study of Information Technology at Rosenbluth Travel, Proceedings of the Twenty-Fourth Annual Hawaii International Conference on System Sciences, vol. 4, Jan. 1991, pp. 287-296.

Greenberg, Ilan, Travelnet to help corporations stem travel expense tide InfoWorld, vol. 17, No. 29, Jul. 17, 1995, p. 25.

Rosenbluth International and AT&T to Provide Business New Travel Solution PR Newswire, Jul. 19, 1995.

Clemons, Eric K., et al., Rosenbluth International: Strategic Transformation of a Successful Enterprise Proceedings of the Thrity Second Hawaii International Conference on System Sciences, 1999.

DiFlorio, Dionino, et al., Air Deal Manager: American Express Provides an End to End Purchasing Management Solution SAS Conferences XVII Seugi, Jun. 1999.

Rosenbluth International Files Suit Against Travel Analytics for Violation of Patent Infringement Laws, PR Newswire, Mar. 17, 2000.

Jones, David, Modeling Tools Mature, Business Travel News, vol. 18, Jan. 15, 2001.

Navigant International Launches Unique Internet-Accessible, Intuitive Reporting Platform, PR Newswire, Jan. 18, 2001.

Shepherd, David, SLAM Model of Domestic Airline Passenger Fairs and the Contract Air Service Program, Air Force Institute of Technology, Sep. 1986.

Travel Manager's Workstation, Travel Systems Institute, 1993, pp. 9-35.

American Express unveils "American Express @ Work, new desktop portal for corporate travel & purchasing", by PR Newswire, Jul. 19, 1999.

Gerwig, Kate, "Online Corporate Traveler", InternetWeek, Sep. 14, 1998.

"American Express launches B2B travel booking technology for mid-sized companies", Canada Newswire, May 29, 2000.

"American Express launches online business travel fulfillment services", PR Newswire, Oct. 16, 2000.

Rogers, et al., "An adaptive interactive agent for route advice", ACM. 1999.

Friedman, et al., "Bias in computer systems", ACM, 1996.

Linden, et al., "Interactive assessment of user preference models: The automated travel assistant", white paper by the Department of Computer Science and Engineering, University of Washington, 1996.

Clemons, et al., "The Nature of Competition in Electronic Markets: An Empirical investigation of the electronic travel agent market", Wise, 1997.

Clemons, et al., "The Nature of Competition in Electronic Markets: An Empirical investigation of the electronic travel agent offerings", white paper by the Department of Operations and Information Management, The Wharton School, Jun. 1999.

Kowtko, et al, "Data collection and analysis in the air travel planning domain", DARPA Speech and Natural Language Workshop 1989.

Upton, Gill, "Deals on Wheels", Supply Management, Jan. 15, 1998.

"BookIt Is the internet booking engine of choice for online travel reservations" PR Newswire, Feb. 17, 1999.

"British Airways: Fifty pluses take flight online", M2 Presswire, Feb. 26, 2001.

Yenckel, James, "Thrifty fliers find network of routes to fare deals", Chicago Sun Times, Feb. 17, 1991.

Fee, John, "Through the Electronic Looking Glass into Living Pictures", Popular Science, Aug. 1981, pp. 68-70.

Yan, et al., "L-CATA: A Logic-Based Expert Travel System", Computer Science in Economics and Management 4; Aug. 1, 1991, pp. 151-163.

"First Integrated Online Travel Management System Offers Cost Control, Compliance with Corporate Travel Policy: Sixth Largest Navigant International First Major User", Jul. 7, 1999, Balitmore-Business Wire, 1 pg.

Travelguidessoftware.com (Nov. 27, 1999) 12 pgs.

* cited by examiner

INTEGRATED TRAVEL INDUSTRY SYSTEM

CROSS-REFERENCE TO RELATED APPLICATIONS

This application claims priority to, and the benefit of, U.S. Provisional Patent Application Ser. No 60/351,804, entitled "TRAVEL NETWORK SYSTEM AND METHOD" and Filed on Jan. 25, 2002, which is hereby incorporated by reference in its entirety.

TECHNICAL FIELD

The present invention generally relates to the travel industry. More specifically, the present invention relates to an integrated travel industry system that may be independent of any computer reservation system (CRS).

BACKGROUND INFORMATION

The last half of the twentieth century, and particularly the last two decades, has been characterized by rapid changes in the travel industry. One example of the changes is the growth of the airline business that has resulted in the proliferation of travel agencies and other travel information groups that require access to large volumes of data in a "real time" environment. This growth has led to many technological advancements in computer reservation systems (CRS), also known as Global Distribution Systems (GDS), for the travel industry. The terms Global Distribution System (GDS) and Computer Reservation System (CRS) will be used interchangeably herein. The GDS is a computer network that provides travel agents and other travel information groups with inventory access related to hotel, condominium, rental car, airline and the like. Examples of such inventory systems include the SABRE system, Amadeus, Galileo/Apollo, System One, and Worldspan. Traditionally, travel agents use a computer that connects directly to a GDS company, such as SABRE or Apollo.

Unfortunately, a direct connection between the travel offices and the GDS typically created a reliance on the GDS, thereby resulting in inefficient processing of traveler reservations. Additional problems have often arisen due to the complexity and cost related to maintaining and updating hardware and software, especially on those systems where there are multiple GDS networks and desktop standards. In addition, there is often a lack of connectivity between travel offices that utilize different GDS systems or configurations due to the private autonomous nature of GDS networks. The autonomous nature of GDS networks lead to further inefficiencies such as the inability to deliver Internet access to the travel offices through the same system. Internet access is desired, as it would allow for the integration of traveler reservations with Internet fares and/or connection with vendor direct inventory.

SUMMARY OF THE INVENTION

In accordance with one aspect of the present invention, an integrated travel industry system comprises an integrated travel network having one or more centralized hub sites, at least one Global Distribution System connected to each of the hub sites, and at least one point of service terminal also connected to one of the hub sites.

In accordance with another aspect of the present invention, the travel industry system may further comprise a plurality of travel vendors that are connected directly to each of the hub sites of the network.

In accordance with a further aspect of the present invention, the travel industry system may also include a plurality of modules that are located on the point of service terminal. The modules may include a low fare search module, a computer telephony integration module, a super passenger name record database, a customer database, a trip planning module, a customer relationship management module, a workflow module, and an integrated e-mail booking system.

BRIEF DESCRIPTION OF THE DRAWINGS

A more complete understanding of the present invention may be derived by referring to the detailed description when considered in connection with the Figures, where like reference numbers refer to similar elements throughout the Figures.

DETAILED DESCRIPTION OF EXEMPLARY EMBODIMENTS

Figure 1:
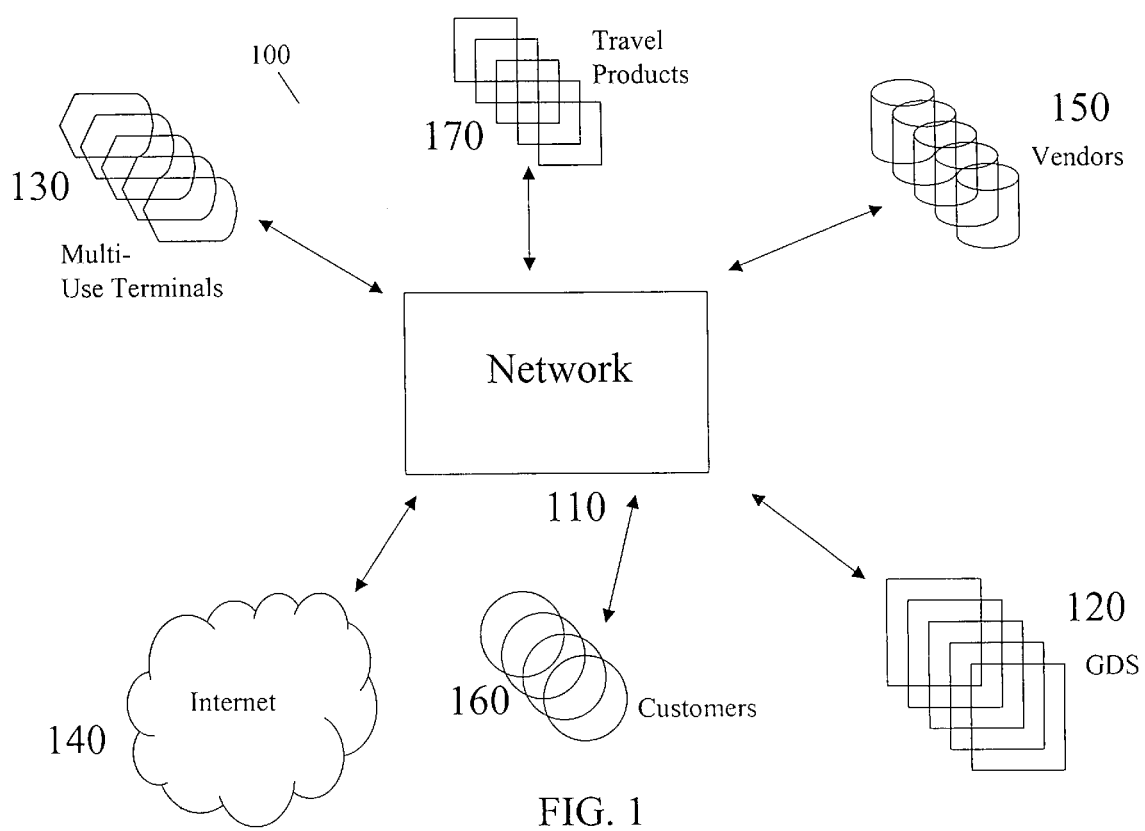
FIG. 1 illustrates a schematic diagram of a travel industry system in accordance with an embodiment of the present invention.

The present invention provides for an integrated travel industry system that includes a travel network that may be provided and managed by a single vendor (e.g., AT&T, British Telecom) that is particularly skilled in providing and servicing networks. In this manner, a managed network can be provided for that is monitored, in all exemplary embodiment, 24 hours a day, 7 days a week thus providing a single or reduced point of contact for outages, and further providing for real time and historical reporting. In accordance with various aspects of the present invention, the travel network may be divided into multiple sub-networks, where each sub-network may be managed a single vendor that could vary. That is, one sub-network may be managed by AT&T and another sub-network may be managed by British Telecom and the sub-networks may be connected together to form the travel network.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), and Microsoft's Visual Studio .NET, with the various algorithms being implemented with any combination of data structures, objects, processes, routines or other programming elements. Further, it should be noted that the present invention might employ any number of conventional techniques for data transmission, signaling, data processing, network control, and the like. For a basic introduction of cryptography and network security, the following may be helpful references: (1)

"Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

As discussed above, a need exists for a system to facilitate the integration between travel offices, the Internet, Global Distribution Systems (GDS), alternate inventory (e.g., limousine providers), vendor direct systems, and other reservation processing technologies (e.g., document delivery, file finishing, trip planning) that does not fully rely upon GDS and is GDS independent. The terms Global Distribution System (GDS) and Computer Reservation System (CRS) will be used interchangeably herein. As stated above, the GDS includes a computer network that provides travel agents and other travel information groups with inventory access related to hotel, condominium, rental car, and airlines, and the like Examples of such inventory systems include the SABRE system, Amadeus, Galileo/Apollo, System One, and Worldspan.

Referring to FIG. 1, the present invention presents all integrated system 100 which enables multiple entities to access various services (e.g., travel services) in a manner that is independent from a particular computer system, such as a GDS system. This system facilitates technology independence from, or limited dependence on, tile GDSs, thereby achieving a network that is business driven, business responsive and enabling a company to become the industry leader.

System 100 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, Windows XP, etc.) as well as various conventional support software and drivers typically associated with computers. User computer can be in a home or business environment with access to a network. In an exemplary embodiment, access is through the Internet through a commercially-available web-browser software package.

Communication between users and system 100 of the present invention is accomplished through any suitable communication means, such as, for example, a telephone network, Intranet, Internet, point of interaction device (point of sale device, personal digital assistant, cellular phone, kiosk, etc), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

With continued reference to FIG. 1, in accordance with an exemplary embodiment, travel industry system 100 comprises a travel network 110, one or more GDS systems 120, and one or more multi-use point of service (POS) terminals 130 located at travel offices and other sites. The customer terminals may be located anywhere in the world and are connected to travel network 110 such that the users of the terminals have access to GDS systems and other features of the System as will be described in detail below.

Travel network 110 is further configured to provide access to the Internet 140 and to a plurality of travel vendors 150 such as airline databases, car and hotel databases, train and bus databases, frequent flyer systems (e.g., Orbit), and the like. This network enables an open consistent vehicle for non-GDS communication such as e-mail, Internet and the like, which is, inter alia, less expensive and less complex than having to provide a separate network for non-GDS communications. It should be appreciated that providing access to the Internet will give e-mail access to POS terminal users of travel industry system 100. Specific information related to the protocols, standards, and application software utilized in connection with the Internet may not be discussed herein. For further information regarding such details, see, for example, Dilip Naik, Internet Standards and Protocols (1998), Java 2 Complete, various authors, (Sybex 1999), Deborah Ray and Eric Ray, Mastering HTML 4.0 (1997). Loshin, TCP/IP Clearly Explained (1997). All of these texts are hereby incorporated by reference.

Travel vendor databases may include databases for travel related services such as airlines, car rental, hotel, train, bus, limousines, and any other travel related service. As used in the system of the present invention, a database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

With continued reference to FIG. 1, external customers 160 may be connected directly to network 110, such that the external customers have direct access to the travel network. In this manner, customers 160 may access various features of the system as described below. In addition, travel products 170 may also be connected directly to network 110. Travel products 170 may include third party travel products such as file finishing, contract optimization, and robotics processing as is well known in the art.

In accordance with one embodiment of the present invention, travel industry system 100 may provide a suitable website or other Internet-based graphical user interface which is accessible by customers 160 and other users of the system. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

Figure 2:
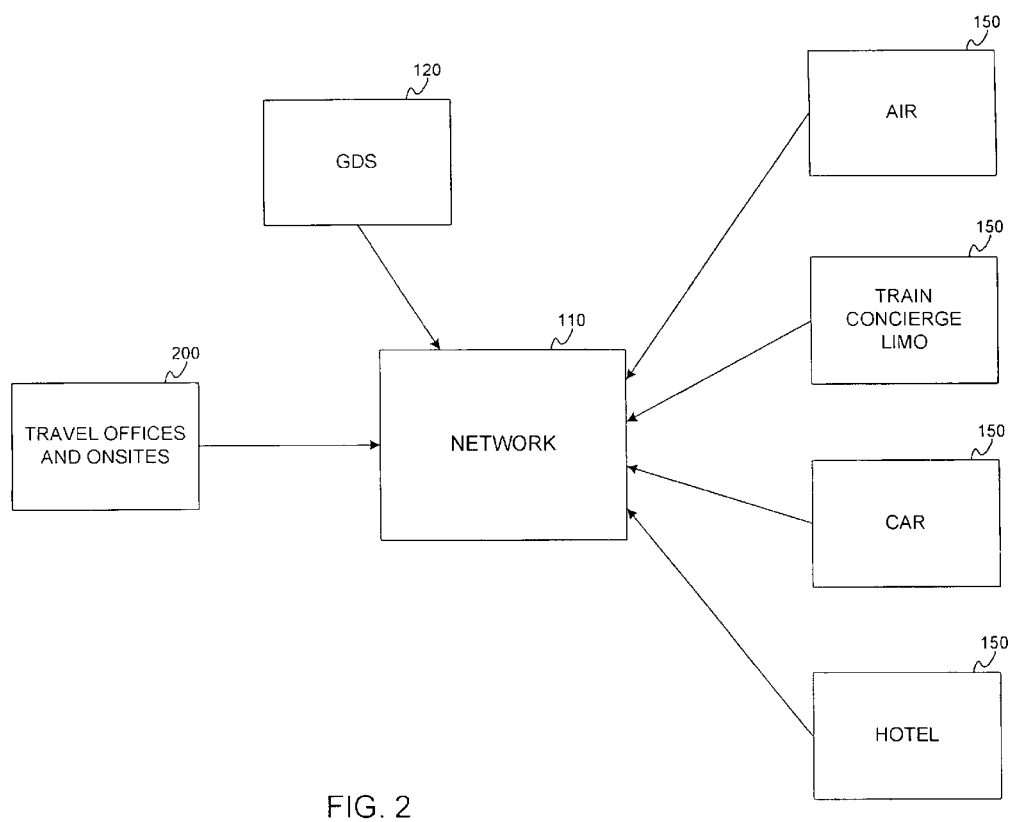
FIG. 2 illustrates a schematic diagram of a travel industry system in accordance with the present invention.

With reference to FIG. 2, in an exemplary embodiment, various components of travel industry system 100 are connected to network 110 such that a centralized connection to network 110 is obtained. For example, GDS systems 120, travel vendors 150, and multi-use terminals 130 at travel offices 200 and other sites may be centrally connected to network 110 such that users of the multi-use terminals have access to various components of system 100 such as GDS systems 120 and travel vendor databases 150.

Figure 3:
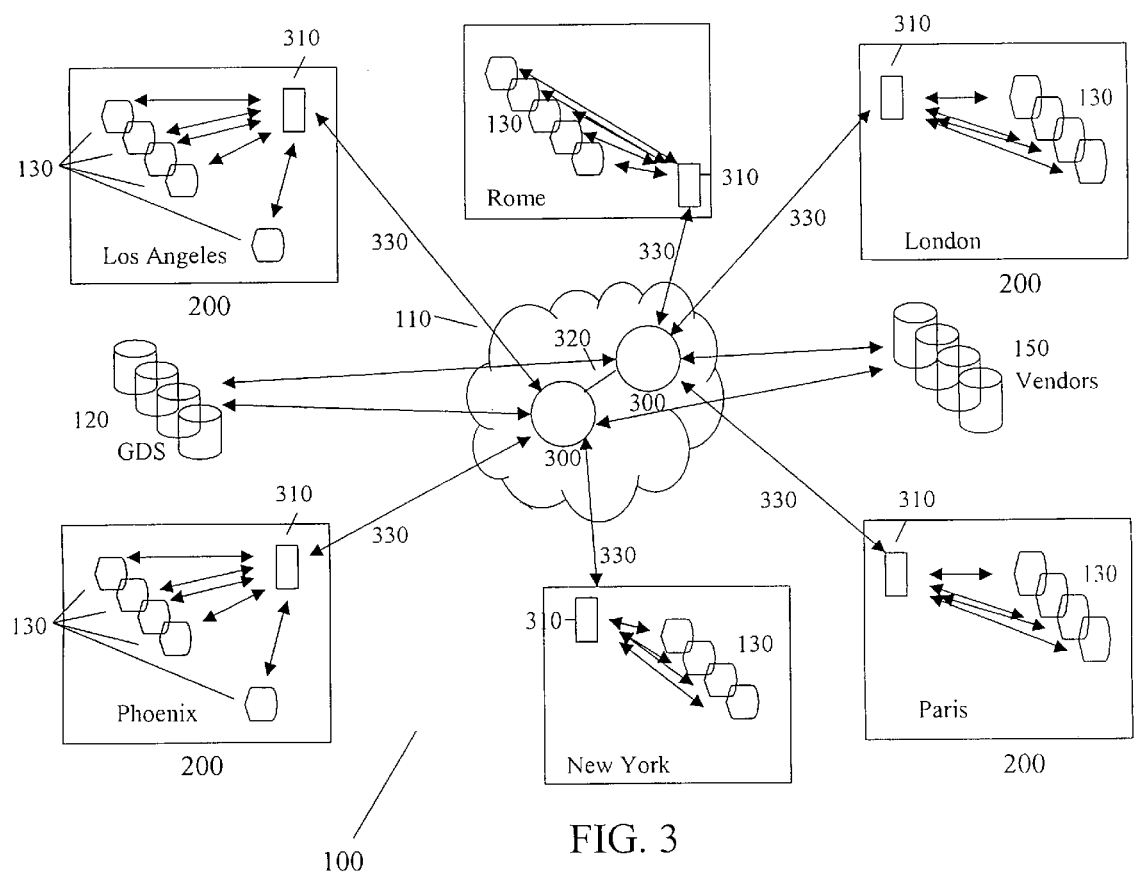
FIG. 3 illustrates a schematic diagram of an exemplary network in accordance with the present invention.

Referring now to FIG. 3, travel network 110, in an exemplary embodiment, comprises a frame relay network having one or more hub sites 300 that are used to connect travel offices and other users from around the world. As is well known in the art, frame relay networks are a type of network that is used to transport data from location to location using connections, Such as network components 310, which may comprise a router or equivalent network device. For example, as illustrated in FIG. 3, there may be travel offices 310 in New York, Phoenix, Los Angeles, Rome, London, and Paris. Travel network 110 provides an integrated network such that any travel office in any city can communicate with any other travel office in any city which will allow for more efficient communication and distribution of information. For example, memos and other information can now be distributed electronically utilizing travel network 110, thus saving time and money compared to previous systems where a travel office could not communicate electronically with another travel office that was utilizing a different GDS system. It will be appreciated that these locations 300 are for exemplary purposes only, and that the present invention is not limited to these locations.

Travel network 110 may use an Asynchronous Transfer Mode (ATM) backbone and multiple redundant data centers. For example, as illustrated in FIG. 3, network 110 may include two hub sites 300 that provide for data redundancy as will be described. Alternatively, network 110 may comprise one hub site or network 10 may comprise more than two hub sites. Data and connectivity redundancy is provided for as long as there are two or more hub sites 300. Alternatively, travel network 110 may comprise any other suitable network that provides similar functionality to a frame relay network.

Hub sites 300 may be connected to each other by network connection 320. In accordance with one aspect of the present invention, network connection 320 may comprise an ATM backbone. Alternatively, network connection 320 may comprise a different type of network connection such as a T1 connection.

In an exemplary embodiment, one or more GDSs 120 are connected to network 110 at each of the hub sites 300. By connecting GDS 120 to the network at hub sites 300, the system provides for a centralized point of contact with all GDSs, as opposed to maintaining separate networks for each GDS. If one of the hub sites is disabled or connectivity to one of the hub sites is otherwise lost, then GDS 120 will still be accessible through one of the other hub sites 300.

Travel vendors 150 may also be connected to network 110 at each of the hub sites 300, thus providing redundant connectivity points for the travel vendors. By centralizing the connection to travel vendors 150, the system of the present invention allows a company to negotiate directly with air, car rental, hotel vendors, and the like, based on direct connections and fulfillment options, wherein connection is not limited only through GDS hosts. Direct connections to various vendors (e.g., air, car rental, hotel, rail, limousines, cruise lines, conference centers, ferries) make it possible for travelers to have a broader range of travel service choices. The present invention also allows alternative supply and distribution channels for products and services which may be provided by plugging a vendor directly into network 110. Alternatively, travel vendors 150 may be accessed via the Internet as described below.

Adding or removing GDS or travel vendor databases from the system is accomplished by adding or removing connections to the GDS and/or travel vendor database at hub sites 300. In this manner, it is not necessary to add or remove hardware equipment or software applications at the individual travel office. The present invention provides for a central connection to all vendors. Clients of the system can change or add GDS vendors without the need to add or replace hardware. In an exemplary embodiment of the present invention, the system includes minimal or no GDS-supplied hardware and allows a company to respond to technology or product improvements with minimal or no GDS approval thus providing for a host independent of individual GDSs.

The system will also allow for load leveling with GDSs to meet minimum contractual transaction amounts. For example, the particular GDS accessed by the travel counselor can be manipulated such that travel transactions can be moved around from GDS to GDS in order to meet minimum transaction amounts. This can be accomplished by changing the GDS accessed by the travel counselor (this is transparent to the travel counselor).

In addition, if a new travel office is to be deployed, the travel office needs only to be connected to network 110 as will be described next. This allows for a short time to market for a new travel office.

Each travel office may have one or more customer terminals 130 that provide user access to the system 100 through network component 310. In accordance with one aspect of the present invention, network components 310 are connected to hub sites 300 by network connections 330 Network connection 300 may be any type of suitable network connection such as T1, ATM, ISDN, and the like. Customer terminals 130 will have access to the various GDSs and travel vendor databases through hub sites 300. The multi-use terminals 130 may be used to provide a single source for accessing multiple GDSs and travel vendor databases for users (travel counselors). These multi-use terminals provide travel counselors with a new user-friendly, browser based Point of Service tool (a. k.a. Customer Information Gateway) that can be used for servicing customers as described in detail below. Travel counselors will only need to be trained on a single computer user interface/software application in order to be able to access a plurality of GDSs and travel vendor databases. Stated another way, multi-use terminal 130 will be operated the same way, no matter which GDS is accessed. In this manner, the customer terminals 130 of the system provide for a user-friendly operation (travel counselors will need little or no GDS format skills) and a customer focused reservation process with minimal or no restrictions by GDS limitations.

If one of the hub sites is disabled, customer terminal 130 may be automatically connected to another hub site 300 that is active via network connections 330 and 320, thus providing continuous network connection for the travel office and their customer terminals.

It will be appreciated that many applications of the present invention could be formulated. One skilled in the art will appreciate that network 110 may interface with any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris, Windows XP, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

Figure 4:
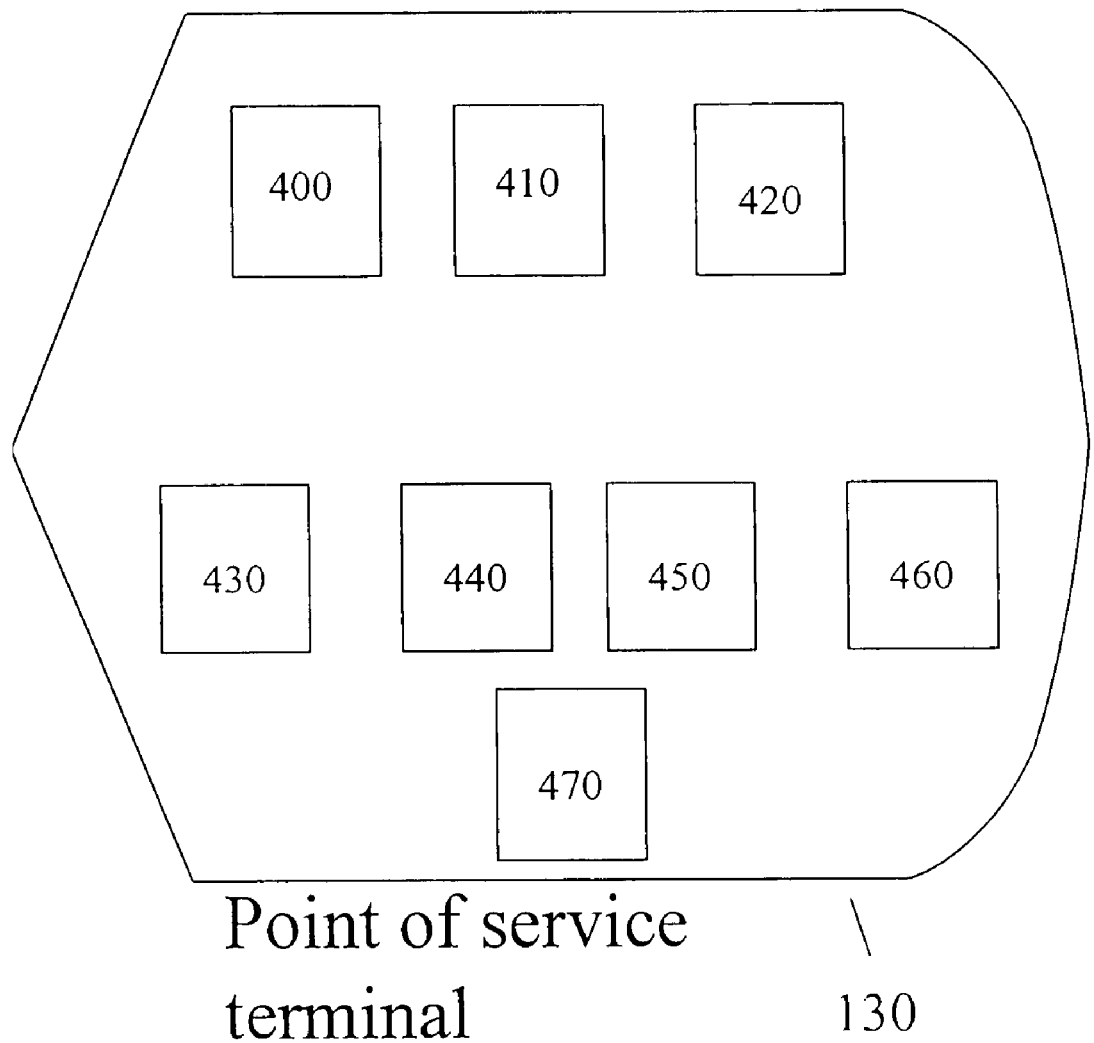
FIG. 4 illustrates a schematic diagram of an exemplary customer terminal in accordance with the present invention.

Referring now to FIG. 4, point of service (POS) terminal 130 provides for a travel counselor browser based point of service application that is GDS independent. It should be appreciated that this streamlines the reservation process and provides for greater operational efficiencies and higher levels of customer service POS terminal 130 comprises, in an exemplary embodiment, a low fare search module 400, a computer telephony integration module 410, a super passenger name record (PNR) module 420, a customer data module 430, a trip planning module 440, a customer relationship management (CRM) module 450, a workflow module 460, and an integrated e-mail booking system 470. These modules can be implemented with software and hardware components as described in detail next.

Low fare search module 400 comprises a dynamic low fare search engine that can search fares from various sources including the Internet, direct connect vendors, proprietary databases (i.e., database of fares that is provided by a company affiliated with the POS terminal's travel office), GDS fares, Airline Tariff Publishing Company (ATPCO) system fares, company private or negotiated fares, and/or the like. By providing access to the Internet, Internet fares can be integrated into the low fare search and provided to the user for comparison for fares from other sources such as CDS and direct connection to travel vendor databases. Thus, system users can search dot com, direct connect, corporate and GDS fares.

In addition, the low fare search module can utilize unused ticket information when calculating the fare displays. The unused ticket information may be stored and tracked in customer data module 430 or in a similar database system. The low fare search module may be implemented by a software application using any of a variety of programming languages and techniques that are well known in the art.

Computer telephony integration module 410 allows for voice information (e.g., phone call) and data (e.g., traveler profile) to be converged at the travel counselor's desktop (i.e., POS terminal). Module 410 integrates off the shelf computer telephony interface (CTI) technology in order to provide voice-over-IP solutions, convergence of voice and data to the desktop (screen pop), and improved features for customer access and identification. In addition, computer telephony integration module 410 provides for the routing of e-mail, Internet, and other information to the travel counselor's desktop (i.e., media blending) 130 such as information from wireless devices (e.g., personal digital assistants), bookings, and customer questions and requests. When a customer places a call to a call center (i.e., travel office), the customer service person will type in customer information such as the customer's name into terminal 130 and all of the information for the customer will be displayed (referred to as a screen pop) on the computer. Customer e-mails to the travel office can be routed to call center agents in a similar manner that phone calls are routed. That is, the e-mails can be routed to next available agent or to an agent with a particular expertise. Using voice-over-IP (Internet Protocol) technology, phone calls into the call center can be distributed over the Internet to remote locations. For example, this will allow call center agents to receive calls at home or at other remote locations accessible by the Internet. In addition, built-in monitors may provide detailed reporting on calls to management. This detailed reporting can include information such as average time per call, number of calls per agent, and the like.

Super passenger name record module 420 comprises a database system that stores travel reservation information. The database system may be implemented with any of a variety of well known database standards such as Oracle, Sybase, and the like. The stored travel reservation information includes information for a particular trip reservation such as specific flight reservation information, hotel reservations, car rental information, and the like. In addition, PNR module 420 may be used to store information for a passenger's contact history with a travel office. For example, the names of travel counselors who assisted the passenger may be stored in PNR module 420. The PNR module may also be used to store fulfillment information that indicates which tickets were issued to the passenger and how much the passenger has been charged for the various reservations. It should be appreciated that storing the travel reservation details outside the GDS promotes data privacy and confidentiality. In addition, the super PNR module provides for consolidated storage of itineraries booked through multiple or direct vendors.

Customer data module 430 comprises a web enabled database system that allows travelers to access and update their traveler profiles over the Internet. In this manner, a user friendly and efficient technique is provided to travelers such that travelers can add additional preferences and the like to their travel profiles. The system provides for full integration of customer policy, profile, negotiated contracts, past/current trip information, and customer relationship management (CRM) data. Information stored in the customer data module database includes customer policies, for example, the corporate travel policies of a particular corporation which contains policies that employees are required to follow. For example, the corporate travel policies may prevent an employee from purchasing a first class airline fare or may require an employee to utilize certain car rental vendors. The customer data module database may also include the customer's negotiated contracts with various vendors (i.e., airlines, car rental agencies, hotels, and the like). The database may also include personal preferences for individuals such as seat preferences (aisle or window) and frequent flyer information. Unused ticket information may also be stored in the customer data module database so that it may be utilized by the low fare module as described above.

Customer data module 430 also provides the ability to accept customer HR feeds and data feeds to and from other products used by the traveler such as Corporate Travel Online (CTO), GetThere, and the like. In addition, customer data module 430 may be implemented such that useful reporting features are provided for the traveler. The travel profiles module may be implemented by using any of a variety of programming languages and techniques that are well known in the art and the database system may be implemented with any of a variety of well known database standards such as Oracle, Sybase, and the like.

Using the customer data module, customers can see their own information and update their own profiles via the Internet. For example, customers can access the customer data module by utilizing a standard Internet browser to access a web site available via the Internet. The customer then logs onto the customer data module using their secure username and password and thereby gain access to the functionality of the customer data module. In this manner, customers can create and update customer personal profiles. Different individuals may be given different access levels to the customer data module. For example, the travel administrators for a corporation may have global access so that they can modify the corporate travel policies for their corporation, while individual employees may have limited access such that they can only access and modify their individual profile.

Trip planning module 440 comprises a software application that may be used to plan trips by providing for any type of reservation that may be required. For example, trip planning module 440 may prompt the user for details on the trip such as destination and dates of travel. The destination may be provided in a variety of forms including airport, destination city, exact address, and the like. Trip planning module 440 will then apply logic to the request using the travel policies, preferred vendor booking preferences, and customer profile to build an optimal option for the trip that includes the travel reservations best suited for the customer according to the travel policies, total cost of the trip, vendor overrides, and customer profile preferences. If the user want to change a specific reservation such as an airline reservation, then this may be accomplished using trip planning module 440. Alternatively, trip planning module may be used to make travel reservations by separately making airline reservations, hotel reservations, car rental reservations, airport limousine reservations, and any other type of reservations that may be required.

A customer relationship management (CRM) module 450 may include an off-the-shelf CRM system such as Oracle, Siebel, and other databases CRM module 450 may be used to capture and store information about traveler and corporations' travel patterns, special interest, customer service inquiries/issues, profile information, frequent travel information, destination information, and specific requested data. This captured information may then be used to analyze and predict future travel spending.

Workflow module 460 comprises software that may be used by for travel counselor workflow and queue management. Since the point of service (POS) terminal 130 provides for a travel counselor browser based point of service application that is GDS independent, it is desired to have GDS independent workflow and queue management processing for the travel counselor. When the travel counselor completes a reservation and queues it for processing, the queued information may be extracted from the GDS queue and converted to text and routed to the first available agent for working. Types of work that may be queued and routed include future ticketing, schedule changes, request for special services vendor confirmations, as well as other travel related operational processes.

Integrated e-mail booking system 470 includes software and/or hardware that may be used to store a formatted e-mail form on any email or internet accessible system. A traveler may then access the form, fill out the trip details, and then e-mail the completed form to an identified email account. The system or travel counselor may then access the email account and process the booking using trip planning module 440. This email booking system greatly reduces the time it takes the traveler and the travel agency to process a reservation.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical"

What is claimed is:

1. An integrated travel industry system comprising:
an integrated travel network having an integrated travel network connection, wherein said integrated travel network connection connects to a plurality of Global Distribution Systems (GDSs), travel vendor databases, multi-use terminals of a plurality of travel counselors, and travel websites independent from a particular computer system, such that said plurality of travel counselors have access to said travel vendor databases and said GDSs, wherein said integrated travel network connection is accomplished via a frame relay network having a plurality of centralized hub sites, wherein each of said plurality of centralized hub sites comprises a hub site network connection, a transport mechanism, and a redundant data center, and uses an asynchronous transfer mode (ATM) backbone to communicate with the other centralized hub sites,
wherein said redundant data center of each of said plurality of centralized hub sites is configured to store a database for said plurality of GDSs;
a first remote travel office site, wherein said first remote travel office site is connected to said integrated travel network by said integrated travel network connection, wherein said first remote travel office site comprises a first point of service terminal connected to at least one of said plurality of centralized hub sites of said integrated travel network, such that said first point of service terminal is configured to access each of said plurality of GDSs, wherein said first point of service terminal is further configured to determine that a previously connected hub site is disabled and then automatically connect to an active centralized hub site;
a second remote travel office site, wherein said second remote travel office site comprises a second point of service terminal connected, via said integrated travel network connection, to at least one of said plurality of centralized hub sites of said integrated travel network, such that said second point of service terminal is configured to access each of said plurality of GDSs, wherein said second point of service terminal is connected, via said integrated travel network connection, to said first point of service terminal such that said second point of service terminal can communicate with said first point of service terminal; and
wherein each of said point of service terminals comprises a GDS-indevendent travel agent user interface for managing a plurality of travel bookings, wherein each travel booking comprises one or more travel reservations for at least one of an airline reservation, a car rental reservation, a hotel reservation, a train reservation, a bus reservation, a limousine reservation, a cruise line reservation, a ferry reservation, and a conference center reservation, wherein said GDS-independent travel agent user interface is configured to allow simultaneous access to said plurality of GDSs for managing a single travel booking across said plurality of GDSs, whereby said GDS-independent travel agent user interface provides a single source for accessing a plurality of travel services; wherein each of said point of service terminals is configured to translate information received, via said integrated travel network connection, from each of said plurality of GDSs into a format that is compatible with said GDS-independent travel agent user interface, and wherein each of said point of service terminals is further configured to translate inquiries received from the GDS-independent travel agent user interface into a plurality of formats that are compatible with said plurality of GDSs; and wherein each of said point of service terminals is further configured to automatically change said accessed GDS to a different GDS, using said integrated travel network connection, in order to meet a contracted minimum transaction amount.

2. The system of claim 1, wherein a plurality of travel vendors are connected to at least one of said plurality of centralized hub sites.

3. The system of claim 1, further comprising: an e-mail database with a plurality of e-mail messages; and wherein said integrated travel network is further configured to provide Internet access.

4. The system of claim 3, wherein said point of service terminals are configured to access said Internet and to access and display said plurality of e-mail messages.

5. The system of claim 1, wherein said point of service terminals further comprise a customer service application tier having at least one of a super passenger name record database, a low fare search module, a customer database, a trip planning module, a customer relationship management module, and a workflow module, wherein said super passenger name record database is configured to store travel reservation information, including flight reservation information, hotel reservation information, car rental information, passenger travel history information, and passenger fulfillment information.

6. A method of providing an integrated travel industry solution, comprising the steps of:

providing an integrated travel network having an integrated travel network connection, wherein said integrated travel network connection connects to a plurality of Global Distribution Systems (GDSs), travel vendor databases, multi-use terminals of a plurality of travel counselors, and travel websites independent from a particular computer system, such that said plurality of travel counselors have access to said travel vendor databases and said GDSs, wherein said integrated travel network connection is accomplished via a frame relay network having a plurality of centralized hub sites, wherein each of said plurality of centralized hub sites comprises a hub site network connection, a transport mechanism, and a redundant data center, and uses an asynchronous transfer mode (ATM) backbone to communicate with the other centralized hub sites, configuring said redundant data center of each of said plurality of centralized hub sites to store a database for each of said plurality of GDSs;

connecting, using said integrated travel network connection, a first remote travel office site to said integrated travel network;

connecting, using said integrated travel network connection, a second remote travel office site to said integrated travel network;

providing a first point of service terminal at said first remote travel office site;

providing a second point of service terminal at said second remote travel office site, wherein said second point of service terminal is connected to said first point of service terminal such that said second point of service terminal can communicate with said first point of service terminal;

connecting, using said integrated travel network connection, each of said point of service terminals to at least one of said plurality of centralized hub sites, such that each of said point of service terminals is configured to access said plurality of GDSs, further configuring each of said point of service terminals to determine that a previously connected hub site is disabled and then automatically connect to an active centralized hub site; and configuring each of said point of service terminals to have a GDS-independent travel agent user interface for managing a plurality of travel bookings, wherein each travel booking comprises one or more travel reservations for at least one of an airline reservation, a car rental reservation, a hotel reservation, a train reservation, a bus reservation, a limousine reservation, a cruise line reservation, a ferry reservation, and a conference center reservation, wherein said GDS-independent travel agent user interface is configured to allow simultaneous access, using said integrated travel network connection, to said plurality of GDSs for managing a single travel booking across said plurality of GDSs, whereby said GDS-independent travel agent user interface provides a single source for accessing, using said integrated travel network connection, a plurality of travel services; and further configuring each of said point of service terminals to translate information received from each of said plurality of GDSs into a format that is compatible with said GDS-independent travel agent user interface, further configuring each of said point of service terminals to translate inquiries received, using said network connection, from the GDS-independent travel agent user interface into a plurality of formats that are compatible with said plurality of GDSs, and further configuring each of said point of service terminals to automatically change, using said integrated travel network connection, said accessed GDS to a different GDS in order to meet a contracted minimum transaction amount.

7. The method of claim 6, further comprising said step of connecting a plurality of travel vendors to at least one of said plurality of centralized hub sites.

8. The method of claim 6, wherein said step of configuring said point of service terminals further comprises configuring said point of service terminals to have a customer service application tier having at least one of a super passenger name record database, a low fare search module, a customer database, a trip planning module, a customer relationship management module, and a workflow module, and configuring said super passenger name record database to store travel reservation information, including flight reservation information, hotel reservation information, car rental information, passenger travel history information, and passenger fulfillment information.

9. A method of providing access to a plurality of travel services in a manner that is independent from any particular computer system, wherein said plurality of travel services include services provided by a plurality of airlines, a plurality of car rental companies, and a plurality of hotels, comprising the steps of:

providing an integrated travel network having an integrated travel network connection, wherein said integrated travel network connection connects to a plurality of Global Distribution Systems (GDSs), travel vendor databases, multi-use terminals of a plurality of travel counselors, and travel websites independent from any particular computer system, such that said plurality of travel counselors have access to said travel vendor databases and said GDSs, wherein said integrated travel network connection is accomplished via a frame relay network having a plurality of centralized hub sites, wherein each of said plurality of centralized hub sites comprises a hub site network connection, a transport mechanism, and a redundant data center, and uses an asynchronous transfer mode (ATM) backbone to communicate with the other centralized hub sites;

configuring said redundant data center of each of said plurality of centralized hub sites to store a database for said plurality of GDSs;

connecting, using said integrated travel network connection, a first multi-use terminal to one of said plurality of centralized hub sites;

connecting, using said integrated travel network connection, a second multi-use terminal to one of said plurality of centralized hub sites, wherein said second multi-use terminal is connected to said first multi-use terminal such that said second multi-use terminal can communicate with said first multi-use terminal;

configuring each of said multi-use terminals to determine that a previously connected hub site is disabled and then automatically connect, using said integrated travel network connection, to an active centralized hub site; and configuring each of said multi-use terminals to access, using said integrated travel network connection, each of said plurality of GDSs and further configuring each of said multi-use terminals to have a GDS-independent travel agent user interface for managing a plurality of travel bookings, wherein each travel booking comprises one or more travel reservations for at least one of an airline reservation, a car rental reservation, a hotel reservation, a train reservation, a bus reservation, a limousine reservation, a cruise line reservation, a ferry reservation, and a conference center reservation, wherein said GDS-independent travel agent user interface is configured to allow simultaneous access, using said integrated travel network connection, to said plurality of GDSs for managing a single travel booking across said plurality of GDSs, whereby said GDS-indevendent travel agent user interface provides a single source for accessing said plurality of travel services; and further configuring each of said multi-use terminals to translate information received from each of said plurality of GDSs into a format that is compatible with said GDS-independent travel agent user interface, further configuring each of said multi-use terminals to translate inquiries received from the GDS-independent travel agent user interface into a plurality of formats that are compatible with said plurality of GDSs, and further configuring each of said multi-use terminals to automatically change, using said integrated travel network connection, said accessed GDS to a different GDS in order to meet a contracted minimum transaction amount.

10. The method of claim 9, wherein said step of configuring said multi-use terminals further comprises configuring said multi-use terminals to have a customer service application tier having at least one of a super passenger name record database, a low fare search module, a customer database, a trip planning module, a customer relationship management module, and a workflow module, and configuring said super passenger name record database to store travel reservation information, including flight reservation information, hotel reservation information, car rental information, passenger travel history information, and passenger fulfillment information.

11. An integrated travel industry system comprising:
an integrated travel network having an integrated travel network connection, wherein said integrated travel network connection connects to a plurality of Global Distribution Systems (GDSs), travel vendor databases, multi-use terminals of a plurality of travel counselors, and travel websites independent from a particular computer system, such that said plurality of travel counselors have access to said travel vendor databases and said GDSs wherein said integrated travel network connection is accomplished via a frame relay network having a plurality of centralized hub sites, wherein each of said plurality of centralized hub sites comprises a hub site network connection, a transport mechanism, and a redundant data center, uses an asynchronous transfer mode (ATM) backbone to communicate with the other centralized hub sites,
wherein said redundant data center of each of said plurality of centralized hub sites is configured to store a database for said plurality of GDSs;
wherein said integrated travel network communicates, using said integrated travel network connection, with a remote travel office site, wherein said remote travel office site comprises a point of service terminal communicating, using said integrated travel network connection, with at least one of said plurality of centralized hub sites of said integrated travel network, such that said point of service terminal is configured to access, using said integrated travel network connection, each of said plurality of GDSs, wherein said point of service terminal is further configured to determine that a previously connected hub site is disabled and then automatically connect, using said integrated travel network connection, to an active centralized hub site; and wherein said point of service terminal comprises a GDS-independent travel agent user interface for managing a plurality of travel bookings, wherein each travel booking comprises one or more travel reservations for at least one of an airline reservation, a car rental reservation, a hotel reservation, a train reservation, a bus reservation, a limousine reservation, a cruise line reservation, a ferry reservation, and a conference center reservation, wherein said GDS-independent travel agent user interface is configured to allow simultaneous access, using said integrated travel network connection, to said plurality of GDSs for managing a single travel booking across said plurality of GDSs, whereby said GDS-independent travel agent user interface provides a single source for accessing, using said integrated travel network connection, a plurality of travel services; wherein said point of service terminal is configured to translate information received from each of said plurality of GDSs into a format that is compatible with said GDS-independent travel agent user interface, wherein said point of service terminal is further configured to translate inquiries received from the GDS-independent travel agent user interface into a plurality of formats that are compatible with said plurality of GDSs, and wherein said point of service terminal is further configured to automatically change, using said integrated travel network connection, said accessed GDS to a different GDS in order to meet a contracted minimum transaction amount.

12. An integrated travel industry system comprising:
an integrated travel network having an integrated travel network connection, wherein said integrated travel network connection connects to a plurality of Global Distribution Systems (GDSs), travel vendor databases, multi-use terminals of a plurality of travel counselors, and travel websites independent from a particular computer system, such that said plurality of travel counselors have access to said travel vendor databases and said GDSs, wherein said integrated travel network connection is accomplished via a frame relay network having a plurality of centralized hub sites, wherein each of said plurality of centralized hub sites comprises a hub site network connection, a transport mechanism, and a redundant data center, and uses an asynchronous transfer mode (ATM) backbone to communicate with the other centralized hub sites, wherein said redundant data center of each of said plurality of centralized hub sites is configured to store a database for said plurality of GDSs;
a remote travel office site communicating with said integrated travel network and having a point of service terminal which is configured to determine that a previously connected hub site is disabled and then automatically connect, using said integrated travel network connection, to an active centralized hub site; and
wherein said point of service terminal comprises a GDS-independent travel agent user interface for managing a plurality of travel bookings, wherein each travel booking comprises one or more travel reservations for at least one of an airline reservation, a car rental reservation, a hotel reservation, a train reservation, a bus reservation, a limousine reservation, a cruise line reservation, a ferry reservation, and a conference center reservation, wherein said GDS-independent travel agent user interface is configured to allow simultaneous access, using said integrated travel network connection, to said plurality of GDSs for managing a single travel booking across said plurality of GDSs, whereby said GDS-independent travel agent user interface provides a single source for accessing, using said integrated travel network connection, a plurality of travel services; wherein said point of service terminal is configured to translate information received from each of said plurality of GDSs into a format that is compatible with said GDS-indevendent travel agent user interface, wherein said point of service terminal is further configured to translate inquiries received from the GDS-indevendent travel agent user interface into a plurality of formats that are compatible with said plurality of GDSs, and wherein said point of service terminal is further configured to automatically change, using said integrated travel network connection, said accessed GDS to a different GDS in order to meet a contracted minimum transaction amount.

* * * * *

UNITED STATES PATENT AND TRADEMARK OFFICE
CERTIFICATE OF CORRECTION

| | |
|---|---|
| PATENT NO. | : 7,499,864 B2 |
| APPLICATION NO. | : 10/217666 |
| DATED | : March 3, 2009 |
| INVENTOR(S) | : David E. Campbell et al. |

It is certified that error appears in the above-identified patent and that said Letters Patent is hereby corrected as shown below:

In Column 12, line 20, please delete "indevendent" and insert therefor --independent--.

In Column 15, line 7, please delete "indevendent" and insert therefor --independent--.

In Column 15, line 48, please delete "center, uses" and insert therefor --center, and uses--.

In Column 17, line 5, please delete "indevendent" and insert therefor --independent--.

In Column 17, line 8, please delete "indevendent" and insert therefor --independent--.

Signed and Sealed this

Twenty-eighth Day of April, 2009

JOHN DOLL
*Acting Director of the United States Patent and Trademark Office*